G. F. & D. SIMONDS & A. A. MARSHALL.
Circular-Saw.

No. 207,450. Patented Aug. 27, 1878.

Witnesses:
C. Clarence Poole
R. N. Evans

Inventors
Geo. F. Simonds
Dan'l Simonds
Alfred A. Marshall
by their att'ys
A. N. Evans & Co.

N. PETERS, PHOTO-LITHOGRAPHER, WASHINGTON, D. C.

UNITED STATES PATENT OFFICE.

GEORGE F. SIMONDS, DANIEL SIMONDS, AND ALFRED A. MARSHALL, OF FITCHBURG, MASSACHUSETTS.

IMPROVEMENT IN CIRCULAR SAWS.

Specification forming part of Letters Patent No. 207,450, dated August 27, 1878; application filed August 2, 1878.

*To all whom it may concern:*

Be it known that we, GEORGE F. SIMONDS, DANIEL SIMONDS, and ALFRED A. MARSHALL, citizens of Fitchburg, Massachusetts, have invented a new and useful Improvement in Circular Saws, of which the following is a clear, full, and exact description, reference being had to the accompanying drawings, making a part of this specification, in which—

Figure 1:
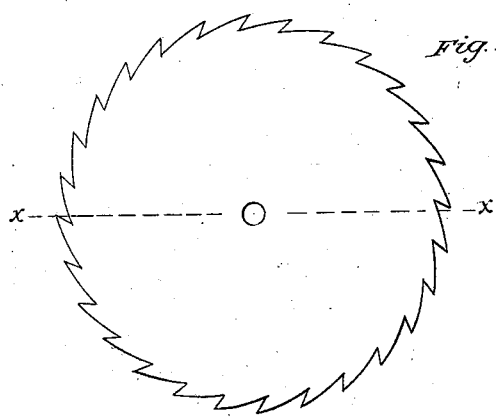
Figure 2:
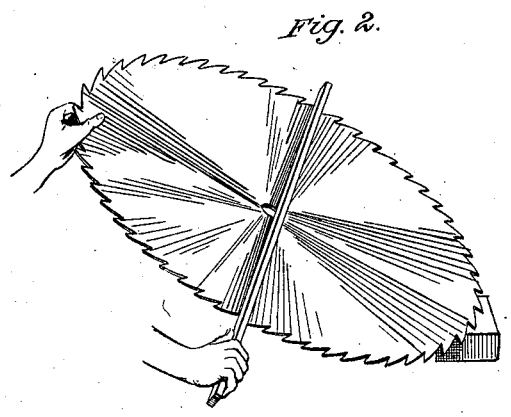
Figure 3:
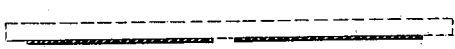
Figure 5:
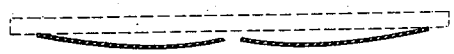
Figure 4:
Figure 6:
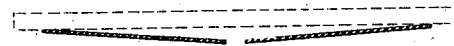

Figure 1 represents a finished saw. Fig. 2 represents a saw in position for testing, as hereinafter described, with a straight-edge applied across its surface. Fig. 3 shows a section through $x\ x$ of a saw when made "firm" throughout, as herein described. Fig. 4 shows section of saw with a straight-edge applied from the eye to the circumference, and indicates the condition termed "loose," as herein described. Fig. 5 shows the same condition from the eye to the circumference, but with the eye deflected from the plane of the circumference. Fig. 6 shows a section of our improved saw with a straight-edge applied across its surface.

To enable others skilled in the art to make and use our invention, we will proceed to describe the manner in which we have carried it out.

In the manufacture of circular saws it is necessary that account shall be taken of and due allowance made for the effect of the speed or rate of revolution at which the saw is designed to run.

In the manufacture of this class of saws it has been found necessary to give them when finished certain delicate and important conditions, having reference, it is supposed, to the tension or strain of different parts upon each other, in order to enable them to perform their work well. These conditions have been secured by the manner in which a saw is hammered, and they are indicated by certain appearances which are presented when a saw is tested in the following manner:

When a circular saw prepared for use is held up vertically with its circumference resting on a support, as shown in Fig. 1, its surface, if it is of uniform thickness, should present substantially a plane; but when a saw is laid down horizontally, or nearly so, as shown in Fig. 2, and supported at opposite points of the circumference, it will spring or sag, either by its own weight or by the application of moderate force, so as to distort its surface. This distortion could be detected and observed by laying a straight-edge across the surface of the saw, and its character depends upon the manner in which the saw had been hammered. To bring the saw into proper condition to perform the work required of it, the workman has been accustomed to hold the saw in the manner as represented by Fig. 2, and to apply a straight-edge to its surface from the eye to the circumference at right angles to a line extending between the two points of support.

If the saw springs so that a line of light appears between its surface and the straight-edge, the saw is said to be "loose." If no such line of light appears, the saw is said to be "firm." These terms are supposed to indicate different conditions of saws as to the tension or strain between different parts.

Fig. 4 shows a section of a saw with a straight-edge applied to it from the eye to the circumference. The space between the curved line or surface of the saw and the straight line of the straight-edge represents, in an exaggerated degree, the line of light which the workman observes. The saw is turned and supported on different points, and the straight-edge applied repeatedly, so that the looseness shall be the same around the entire zone. Sometimes the saw is so hammered that the eye will fall away from a straight-edge applied across the whole disk, as in Fig. 5, but still not so but that when applied from the eye to the circumference the saw will be loose between those two points and present the appearance indicated by Fig. 4.

The condition indicated by the term "loose," and by virtue of which its surface falls away from a straight-edge when applied to it in the manner described, is essential to all saws running at high speed, and the amount of looseness must vary with the sizes of saws, the rate of revolution, and, to some extent, with their thickness; but it will be observed that the condition into which saws have been put or left in finishing is such that under the test applied they are loose in a zone between the eye and the circumference, and the surface of the saw under the straight-edge presents a curved line.

In our improved saw the condition into which it is put or left in finishing is widely different as to its looseness. The straight-edge is applied entirely from one side to the other, in the manner represented in Fig. 6, and the saw must fall away from it in such a manner that the eye will be the part at the greatest distance from it, and the line of the surface of the saw below it, instead of being curved, must be straight, so that if the straight-edge were applied, as in Fig. 4, to a radius, or from the eye to the circumference, the saw would be firm between those two points, while it is loose from one point in the circumference to the opposite point, and the lines of deflection are straight lines instead of curved. Thus the space between the surface of the saw and the straight-edge is bounded, as seen in Fig. 6, entirely by straight lines, which form a triangle. It is easy to see that the condition of such a saw as to the tension or strain of its parts is very different from that which must exist in a saw which has a loose zone between the eye and the circumference, and that the strain of the centrifugal force must be exerted and distributed very differently.

The advantages which our saws possess over the old saws are that they will stand harder crowding, will work faster, and last longer.

What we claim as new, and desire to secure by Letters Patent, is—

The improved circular saw herein described, made firm with reference to its radii, but loose with reference to its diameter.

GEORGE F. SIMONDS.
    DANIEL SIMONDS.
    ALFRED A. MARSHALL.

Witnesses:
 JOHN SIMONDS,
 GEO. E. FERSON.